(12) United States Patent
Voigt

(10) Patent No.: US 9,598,241 B2
(45) Date of Patent: Mar. 21, 2017

(54) TENSIBLE RETURN UNIT FOR APRON CONVEYOR

(71) Applicant: Caterpillar Global Mining Europe GmbH, Lünen (DE)

(72) Inventor: Robert Voigt, Bochum (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 0 days.

(21) Appl. No.: 14/439,378

(22) PCT Filed: Oct. 15, 2013

(86) PCT No.: PCT/EP2013/003096
§ 371 (c)(1),
(2) Date: Apr. 29, 2015

(87) PCT Pub. No.: WO2014/067618
PCT Pub. Date: May 8, 2014

(65) Prior Publication Data
US 2015/0274430 A1 Oct. 1, 2015

(30) Foreign Application Priority Data
Nov. 2, 2012 (DE) .................. 20 2012 104 211

(51) Int. Cl.
*B65G 23/44* (2006.01)
*E21F 13/06* (2006.01)
(Continued)

(52) U.S. Cl.
CPC ........... *B65G 23/44* (2013.01); *B65G 17/066* (2013.01); *B65G 17/12* (2013.01); *B65G 17/34* (2013.01);
(Continued)

(58) Field of Classification Search
CPC .................. B65G 23/44; E21F 13/06
See application file for complete search history.

(56) References Cited

U.S. PATENT DOCUMENTS 3,690,445 A * 9/1972 Ouska ............... B65G 17/067
198/822
4,241,824 A * 12/1980 Georg ................ B65G 19/08
198/517
(Continued)

FOREIGN PATENT DOCUMENTS

AU 780167 3/2005
CN 201817060 5/2011
(Continued)

OTHER PUBLICATIONS

International Search Report mailed Mar. 17, 2015, in Application No. PCT/EP2013/003096 by European Patent Office (3 pages).
(Continued)

*Primary Examiner* — Thomas Randazzo

(57) ABSTRACT

A reversing station of an apron conveyor is disclosed. The reversing station may have a machine frame including a base having a recess. The reversing station may also have a slide construction movable relative to the machine frame by means of an adjusting device and having a guide base displaceably guided in the recess. The reversing station may have a chain wheel fastened to the slide construction. The reversing station may also have guide elements fastened to a front region of the guide base of the slide construction and cooperating with guide rails fixedly fastened to the base of the machine frame. The reversing station may have a fixing device mountable to a front region of the slide construction. The chain wheel may be disposed on the slide construction in a middle portion between a stop for the adjusting device and the front region of the guide base.

15 Claims, 3 Drawing Sheets

(51) Int. Cl.
  *B65G 17/06* (2006.01)
  *B65G 17/34* (2006.01)
  *B65G 17/12* (2006.01)
  *E21C 35/12* (2006.01)
  *B65G 19/06* (2006.01)

(52) U.S. Cl.
  CPC .............. *B65G 19/06* (2013.01); *E21C 35/12* (2013.01); *E21F 13/06* (2013.01)

(56) References Cited

U.S. PATENT DOCUMENTS

| | | | | |
|---|---|---|---|---|
| 4,567,980 | A | * | 2/1986 | Pirovano ................ B65G 19/14 198/814 |
| 5,984,083 | A | * | 11/1999 | Hosch .................... B65G 23/44 198/810.04 |
| 6,422,382 | B1 | * | 7/2002 | Ertel ...................... B65G 21/02 198/841 |
| 6,601,692 | B2 | | 8/2003 | Schaefer et al. |
| 6,981,584 | B2 | * | 1/2006 | Grabmann ........... B65G 17/065 198/850 |
| 9,156,621 | B2 | * | 10/2015 | Padberg .................. B65G 19/28 |
| 2002/0074214 | A1 | | 6/2002 | Klabisch et al. |
| 2003/0010604 | A1 | | 1/2003 | Schaefer et al. |
| 2013/0199898 | A1 | * | 8/2013 | Baier ................... B65G 19/287 198/735.2 |
| 2015/0027858 | A1 | * | 1/2015 | Brotzmann .......... B65G 17/066 198/850 |

FOREIGN PATENT DOCUMENTS

| | | | |
|---|---|---|---|
| CN | 102673950 | | 9/2012 |
| DE | 506420 C | | 9/1930 |
| DE | 2318923 A1 | * | 10/1974 ............. B25G 23/44 |
| DE | 19721201 B4 | | 4/2006 |
| DE | 10 2006 014455 A1 | | 10/2007 |
| DE | 102010013476 A1 | | 5/2012 |
| EP | 1688374 A1 | | 9/2006 |
| WO | WO 98/40292 A1 | | 9/1998 |

OTHER PUBLICATIONS

International Search Report mailed Jan. 29, 2014, in Application No. PCT/EP2013/003104 issued by the European Patent Office (2 pages).

U.S. Appl. No. 14/439,537 of Robert Voigt titled "Chain Wheel for Apron Conveyor" filed on Apr. 29, 2015.

* cited by examiner

US 9,598,241 B2

TENSIBLE RETURN UNIT FOR APRON CONVEYOR

CLAIM FOR PRIORITY

This application is a U.S. National Phase entry under 35 U.S.C. §371 from PCT International Application No. PCT/EP2013/003096, filed Oct. 15, 2013, which claims benefit of priority of German Patent Application No. 202012104211.8, filed Nov. 2, 2012, all of which are incorporated herein by reference.

TECHNICAL FIELD

The present disclosure relates to a reversing station for an apron conveyor for material, such as minerals, ore, rock, concrete or the like, mined or extracted with a mining machine, having a machine frame and a chain wheel mounted in the machine frame, for the diversion of a conveyor chain comprising interlocking chain links, as well as transport plates, connected to individual chain links, for material transport.

BACKGROUND

In underground mining, in some cases also for the transport of bulk materials, it is known to transport the material to be transported by means of an apron conveyor belt of an apron conveyor, which, as an endless transport chain belt, circulates between chain wheels disposed in a drive station and in a reversing station. The material transport then takes place on the top side of the transport plates, whilst the conveyor chain serves only to move the transport plate. Such an apron conveyor is known, for example, from DE 976 637.

In modern underground mining, so-called scraper chain conveyors, in which the mined material is moved as debris by means of drivers in an upwardly open conveyor trough, are generally used. The material is here discharged onto the conveyor base of the conveyor trough and is there led out of the mining region by means of the drivers and delivered, for example, to a belt conveyor in the drift. DE 197 21 201 B4 discloses, for ore mining operations, a face conveyor, in which the conveyor chain circulates in a chain guide channel on the respective inner side of the feed strand and return strand for the chain belt. The drivers consist of angular scrapers, wherein the return strand and the feed strand are disposed side by side and in obliquely angled-off arrangement and the diverting station is provided with a tensioning device for changing the tension of the circulating chain belt. Such a construction leads to a relatively flat conveyor, wherein the main field of application of the conveyor from DE 197 21 201 B4 is the mining of ore using the blasting method.

DE 20 2012 100 777 U1 discloses an apron conveyor in which the feed strand and the return strand for the conveyor chain provided with transport plates lie side by side and the chain wheel in the reversing station can be displaced by means of a tensioning cylinder relative to the chain wheel in a drive station. The present disclosure relates to a reversing station, in particular, for an apron conveyor of the kind which is known from DE 20 2012 100 777 U1 and in which the transport plates are tiltable relative to a chain connecting part in order, by folding the plate away downwards, to deliver to another conveyor the material transported horizontally on the transport plate belt.

The present disclosure is directed, at least in part, to improving or overcoming one or more aspects of prior systems.

SUMMARY OF THE DISCLOSURE

According to an aspect of the present disclosure, a reversing station of an apron conveyor for mined or extracted ground material, such as minerals, ore, rock, concrete or the like, may comprise a machine frame including a base having a recess and a slide construction movable relative to the machine frame by means of an adjusting device and having a guide base displaceably guided in the recess. The disclosed reversing station may further comprise a chain wheel fastened to the slide construction, guide elements fastened to a front region of the guide base of the slide construction and cooperating with guide rails fixedly fastened to the base of the machine frame, and a fixing device mountable to a front region of the slide construction. The slide construction may be lockable in different displacement positions by means of the fixing device. The chain wheel may be disposed on the slide construction in a middle portion between a stop for the adjusting device and the front region of the guide base of the slide construction.

Other features and aspects of this disclosure will be apparent from the following description and the accompanying drawings.

DETAILED DESCRIPTION

Figure 1:
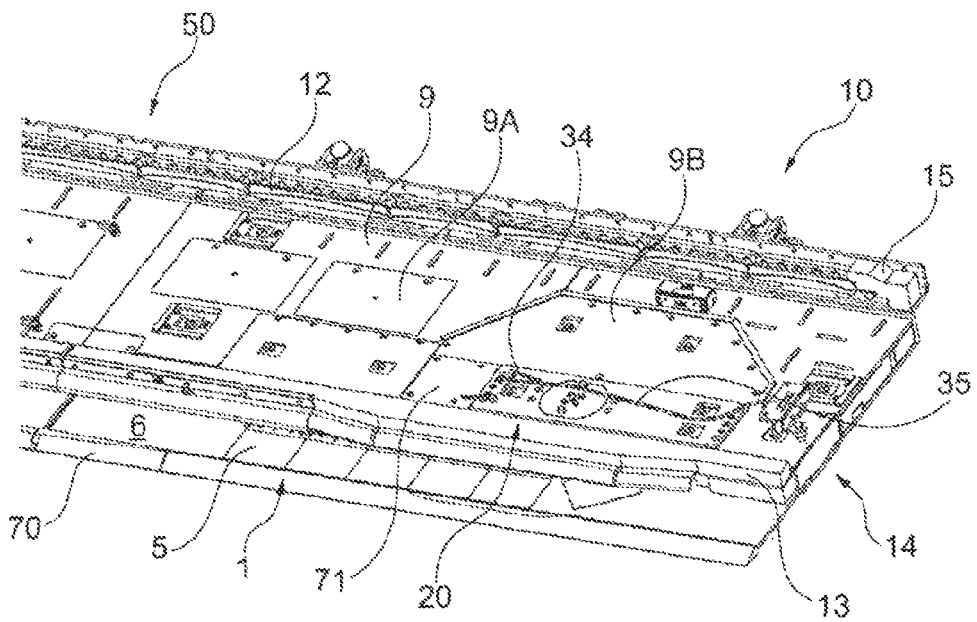
FIG. 1 shows in perspective view an exemplary disclosed reversing station, fully installed.
Figure 2:
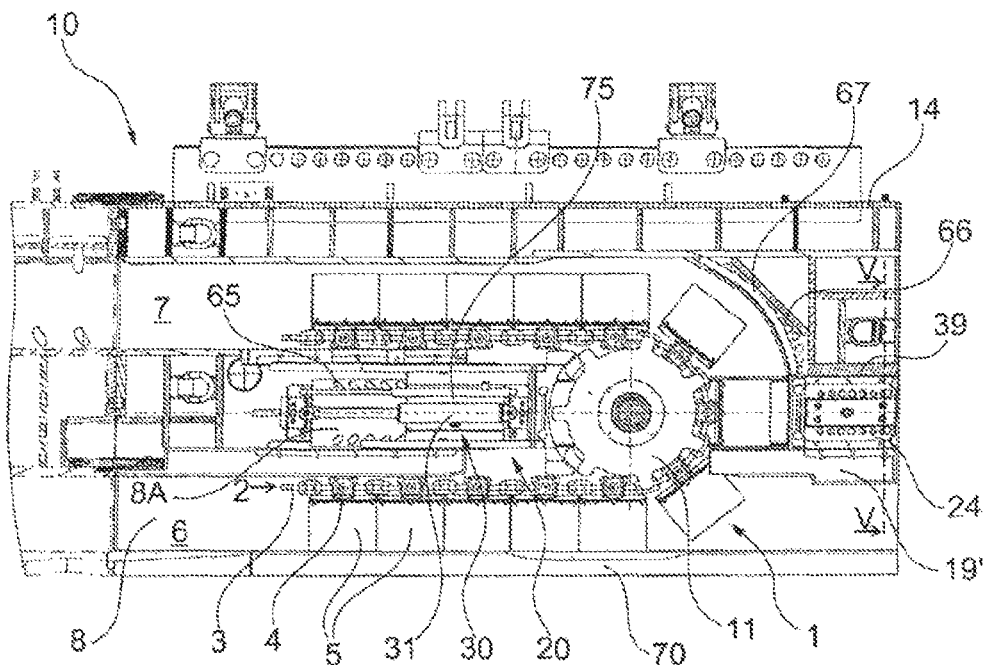
FIG. 2 shows the reversing station from FIG. 1 in top view with removed cover plates and fully extended adjusting device.
Figure 3:
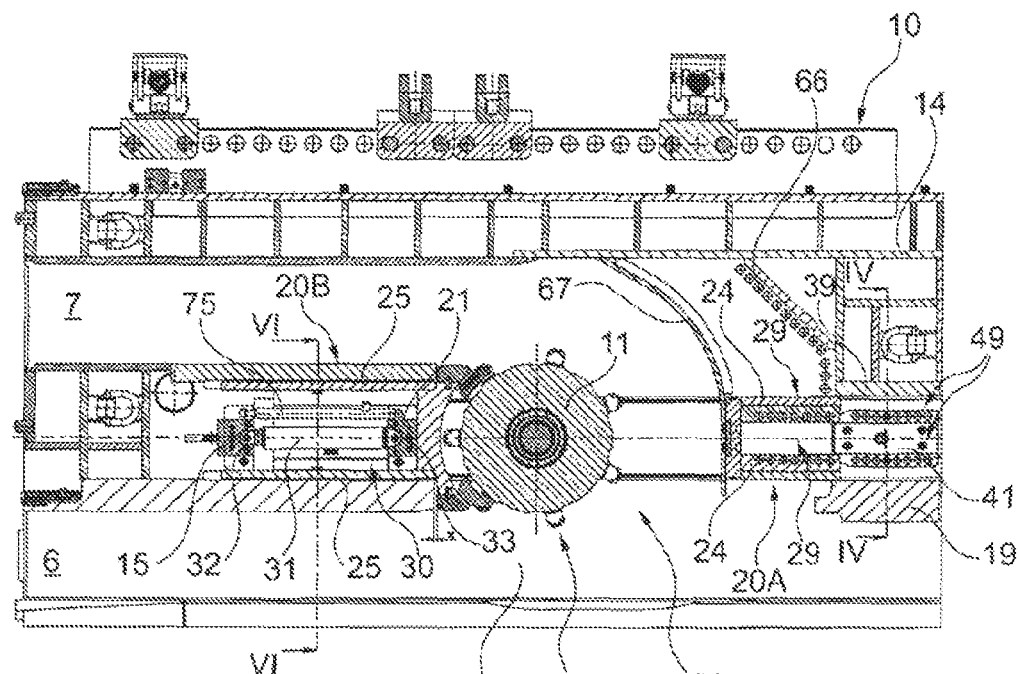
FIG. 3 shows the reversing station in top view without conveyor chain and with fully retracted adjusting device.

In FIGS. 1 to 3, an exemplary disclosed reversing station for an apron conveyor, which reversing station can be used, in particular, in minerals mining, such as ore extraction, is denoted in its entirety by reference symbol 10. Of the apron conveyor, however, only the reversing station 10 and, in part, a trough pan element 50 are represented. With a multiplicity of like-constructed trough pan elements 50, and a drive station (not represented) with driven chain wheel, an apron conveyor is formed. Circulating in the apron conveyor is a conveyor chain, denoted only in FIGS. 1 and 2 by reference symbol 1, which consists of a chain strand, composed of alternately interlocking chain links 3, and of transport plates 5, which in the shown illustrative embodiment are connected to every second horizontally lying chain link 3 by a chain connecting part 4. On the top side of the transport plates 5, the mined material can be conveyed to the drive station (not shown). The transport plates 5 are preferably tiltable relative to the chain connecting parts 4 (though this is of no material importance to the present disclosure) in order to allow the transport plates 5 to be unloaded in the drive station by tilting thereof, as is more specifically described in DE 20 2012 100 777 U1, to the disclosure of which reference is additionally made. In the whole of the apron conveyor, and therefore also in the reversing station 10, the conveyor chain 2, with the connected transport plates 5, runs in a feed strand 6 from the reversing station 10 to a drive station and in a return strand 7 from the drive station to the reversing station 10, wherein the feed strand 6 and the return strand 7 lie side by side in the same plane such that the transport plates 5 slide over the respective base 8 of the feed strand 6 and of the return strand 7. The base 8 forms at the same time the base 8 of the machine frame 14. The conveyor chain 2 lies inside and runs tangentially into the chain wheel 11 in the reversing station and out of the same. The chain wheel 11 of the reversing station 10 is constructed without a drive, yet it is rotatably mounted. It is also displaceable in the machine frame 14, as will be further explained, and the chain wheel 11 can rotate about an axis standing perpendicular to the base 8 of the reversing station 10. At the chain wheel 11 of the reversing station 10, the conveyor chain 2, with the connected transport plates 5, is diverted from the return strand 7 into the feed strand 6. As FIG. 1 clearly shows, the return strand 7 is here covered over the whole of the running length between the drive station and the reversing station 10 by means of diverse, in some cases detachable cover plates 9, 9A, 9B, to prevent the mined material, as far as possible, from penetrating into the return strand 7. By contrast, the feed strand 6 is upwardly open in order that the transport plates 5, in all regions along the length of an apron conveyor, can be loaded with the material mined by a mining machine (not shown). To this end, the mining machine travels along machine guides 12, 13, which are fastened to the top side of the machine frame 14 of the reversing station 10 and also to the individual trough pan elements 50. In FIG. 1, for example, the stowage-side machine guide 12 consists of individual pin gear rods, and the mining machine can be moved up to a stop 15 which is likewise disposed on the machine frame 14 of the reversing station 10. In an ore mining operation, the reversing station 10, as also the drive station (not shown), is preferably positioned outside the actual mining region, for example in an auxiliary drift, and the reversing station 10 forms a waiting position for the mining machine outside that region where material is still being extracted. The waiting position relocated in the reversing station facilitates the advancement of the apron conveyor, together with the mining machine, as the mine working progresses.

The chain wheel 11 of the reversing station 10 can be displaced parallel to the running path of the conveyor chain 2 in order to tension or slacken the conveyor chain 2. To this end, the chain wheel 11 is fastened to a slide construction (denoted in its entirety by reference symbol 20 in the figures), the structure of which will be further explained with additional reference to FIGS. 4 to 8. Owing to the relatively flat construction of the reversing station 10, which is achieved already by virtue of the mutually adjacent strands 6, 7 as the track for the transport plates 5, the slide construction 20 extends over a relatively long region and the slide construction has, related to the running direction of the conveyor chain 2 to both sides, i.e. in front of and behind the mounting position for the chain wheel 11, a respective slide portion 20A, 20B. In the shown illustrative embodiment, the rear slide portion 20B of the slide construction 20, which lies facing the drive station, is acted on by the adjusting device 30 for the slide construction 20, for which purpose a hydraulic cylinder 31 (represented in FIG. 2 in the fully extended and in FIG. 3 in the fully retracted state) is positioned there. The, in FIGS. 2 and 3, left-hand stop lug 32 of the hydraulic cylinder 31 is fastened to a first stop 15, which is fixedly secured to the base 8 of the machine frame 14. By contrast, the front stop lug 33 of the hydraulic cylinder 31 acts on a second stop 21, which is anchored to the slide construction 20 in the rear slide portion 20B, here, however, at the transition to the middle slide portion 20C. One of the stop lugs 32, 33 respectively engages in an associated lug receiving fixture on the stops 15 and 21, wherein it is clearly apparent from FIG. 3 that the connecting lugs 32, 33 have a mutually different shape and engage fittingly in the correspondingly congruently shaped lug receiving fixtures.

The whole of the adjusting device 30 is located between the two strands 6, 7 and within the region circumnavigated by the conveyor chain 2 and lies concealed and protected beneath cover plates 71 for the rear slide portion 20B of the slide construction 20. The supply to the hydraulic cylinder 31 is realized via hydraulic connections 34 and hydraulic lines 35, as indicated in FIG. 1. Parallel to the hydraulic cylinder 31, a reed rod 75, as a measuring device for the current displacement position, is disposed between the slide construction 20 and the machine frame 14. The relative position or state of extension of the hydraulic cylinder can be registered with the reed rod 75 and delivered as a control signal to a machine control system for the reversing station in order to determine whether sufficient take-up for the chain is still available, or not, within the reversing station.

Figure 7:
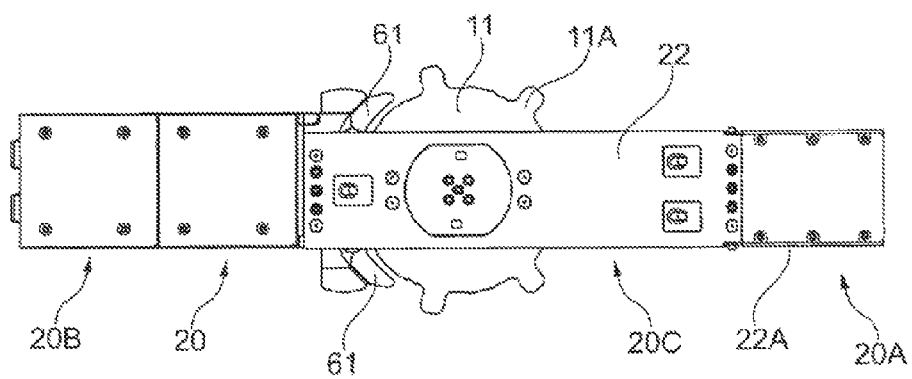
FIG. 7 shows a top view of the slide construction for the exemplary disclosed reversing station.
Figure 8:
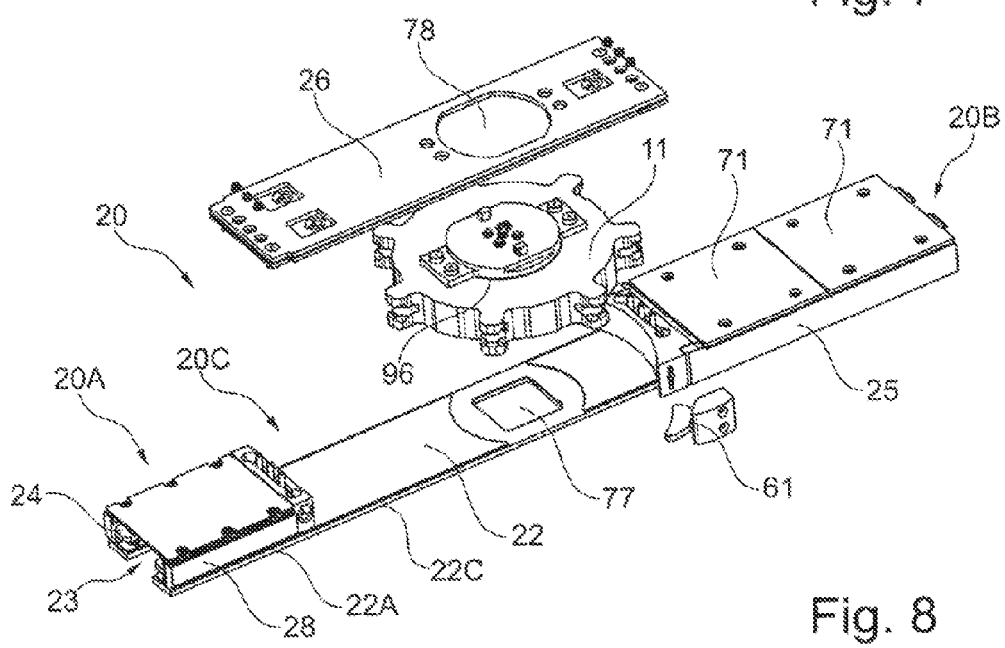
FIG. 8 shows the slide construction in perspective view in exploded representation.

In order to transmit the forces applied by means of the hydraulic cylinder 31 for tensioning of the conveyor chain 2 reliably to the chain wheel 11 and to be able to displace the latter even when the conveyor chain 2 is operatively mounted, the slide construction 20 is multiply guided on the machine frame 14 of the reversing station 10. FIGS. 7 and 8 show the basic structure of the slide construction 20. The slide construction 20 has, inter alia, a guide base 22, which in its front region 22A merges into two sheet-metal strips which are distanced apart by a wide slot 23 and to the top side of which, to both sides of the slot 23, is respectively fastened a guide element 24. The guide elements 24 here have a U-shaped or C-shaped cross section and consist of correspondingly shaped, strong profile mouldings, which, by virtue of the profile shape, respectively have an inwardly open groove. With these grooves in the guide elements, a vertical guidance and lateral guidance of the front region 20A of the slide construction on the machine frame 14 can be effected.

Figure 4:
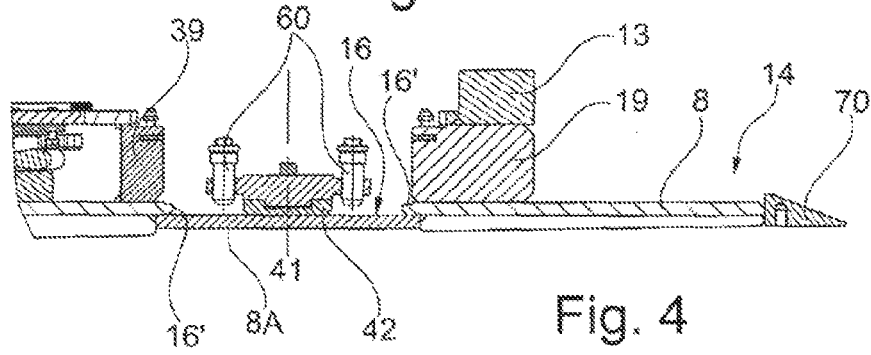
FIG. 4 shows a sectional view along IV-IV in FIG. 3.
Figure 5:
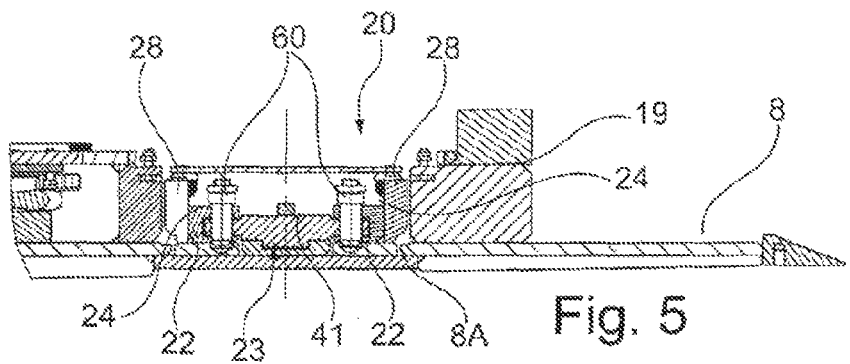
FIG. 5 shows a sectional view along V-V in FIG. 2.
Figure 6:
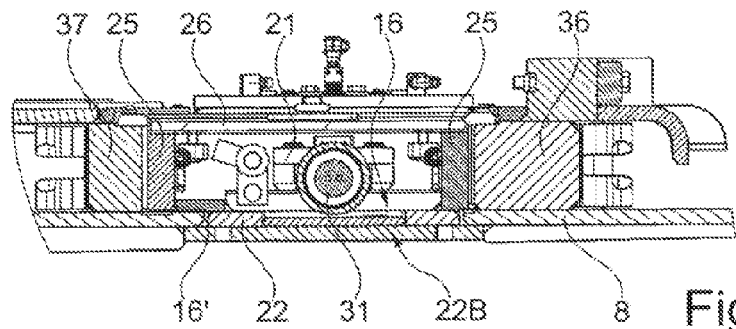
FIG. 6 shows a sectional view along VI-VI in FIG. 3.

The lateral guidance of the slide construction is achieved, inter alia, via the guide base 22 of the slide construction 20, which guide base, for this purpose, as shown in particular by FIG. 4 to FIG. 6, sits recessed in a recess 16 in the base 8 of the machine frame 14, which recess extends along the possible motional path for the slide construction 20 with mutually parallel side edges 16'.

In the rear region, the slide construction 20 is provided with two side beams 25, which are connected to the guide base 22 and which run parallel to each other and also lie parallel to the working direction of the hydraulic cylinder 31. Also in the front region 20A of the slide construction 20, to the side of the guide elements 24 strong guide beams 28 are fastened to the base plate 22, which ensure a certain height of the slide construction 20. Via the side beams 25 in the rear region 20B and the guide beams 28 in the front region 20A, a further lateral stabilization for the slide construction 20 displaceable in the machine frame 14 can be achieved. The guidance of the front region 20A of the slide construction 20 is now first explained with reference, in particular, to FIGS. 3 to 5. Since FIG. 3 shows the slide construction 20 with fully retracted hydraulic cylinder 31, there is no physical contact between the guide elements 24 in the front region 20A of the slide construction 20 and a guide rail 41, which within the recess 16 of the machine frame 14 is fastened to the latter. In the central region 22C of the guide base 22 and in the rear region (22B, FIG. 6), on the other hand, the guide base 22 thoroughly fills the width of the recess 16 and sits depressed in the recess 16 in the base 8 of the machine frame 14. The guide base 22 and the recess 16 ensure guided displaceability of the slide construction 20 relative to the machine frame 14, wherein the recess 16 is longer than the total length of the guide base 22 of the slide construction 20.

By means of the side beams 25 and guide beams 28, the slide construction is lent a certain height in the front region 20A and in the rear region 20B. This height enables, on the one hand, the flat chain wheel 11 to be disposed between the guide base 22 and a bridge plate 26, which latter, above the chain wheel 11, can be releasably fastened to the front region, comprising the guide elements 24 and guide beams 28, and rear region, comprising the side beams 25, of the slide construction 20. The guide base 22 and the bridge plate 26 respectively have in the central region 20C of the slide construction 20 a window 77 and 78 for congruently shaped portions on the housing 96 of the mounting arrangement for the chain wheel 11. The guidance of the slide construction 20 in the front region 20A is preferably realized not only via the recess 16 in the base 8 of the machine frame 14, but additionally also via stays 19, 39, which in this region are fastened to the base 8 of the machine frame 14 and between which the slide construction is guided by means of the guide beams 28, as shown by FIG. 5. The side beams 25 in the rear region 20B of the slide construction 20 are guided in similar fashion between strong stays 36 and 37 connected to the base 8 to both sides of the recess 16. All stays 19, 39, 36, 37 serve at the same time also for the fastening of cover plates 9 and/or for the fastening and support of a machine guide 13.

For cooperation with the guide elements 24 in the front region 20A of the slide construction 20, the machine frame 14 has close to the rear end and outside the region of circulation of the conveyor chain 2 a flat, blade-like guide rail 41, which is connected by a supporting beam 42 to the sub-base 8A. The sub-base 8A, in turn, closes off the recess 16 downwards in the machine base 8 and forms its bottom. The whole of the slide construction 20 hence slides on the top side of the sub-base 8A and sits with the guide base 22 recessed in the recess 16. With fully extended cylinder, the sheet-metal strips of the guide base 22, to both sides of the slot 23, now engage in the respective interspace between the supporting beam 42 and the side edges 16' of the recess 16 and, at the same time, the claw-like guide elements 24, which are fastened to the top side of the guide base 22 in the front region 20A of the slide construction 20, clasp the lateral, blade-like portions on the guide rail 41. In the possible region of overlap, both the blade-like portions on the guide rail 41 and the claw-like guide elements 24 respectively have a row of holes 49 and 29 comprising a plurality of holes, into which, in dependence on the displacement position of the slide construction 20 relative to the machine frame 14, a locking pin 60 can respectively be releasably inserted. The holes of the rows of holes 29, 49 preferably have a vernier graduation in order that, in a specific displacement position between the slide construction 20 and the machine frame 14, respectively only one hole in the row of holes 29 and one hole in the row of holes 49 are in alignment one above the other and only there can the locking pin 60 then be inserted. The locking pins 60 serve as a fixing device to allow fixing of the respectively set relative position between the slide construction 20 and the machine frame 14, and thus also of the current position of the bearing axle of the chain wheel 11 in the reversing station relative to the position of the chain wheel in the drive station, as well as to allow pressureless switching of the hydraulic cylinder of the adjusting device 30 whilst maintaining the chain tension set via the adjusting device in the conveyor chain.

As can clearly be seen from FIG. 7, the chain wheel 11, in the assembly position, protrudes to both sides with its teeth 11A laterally over the side boundaries of the slide construction 20, so as to cooperate with the respective chain links in the conveyor chain. In the transition to the rear region 20B, chain deflectors 61 are removably fitted.

Since within the entire range of displacement of the slide construction 20 relative to the machine base 8 or to the sub-base 8A smaller lumps of rock could infiltrate, which lumps could prevent or block displacement of the slide construction 20 relative to the machine frame 14, both the sub-base 8A between the recess 16 in the base 8 and the base 8 itself, at least close to the rear end of the reversing station 10, are provided with passages 65 and 66, via which corresponding material, which may possibly have also remained lying on the transport plates, can be discharged downwards. The slide construction 20 is additionally provided with a baffle plate 67, which closes off the rear region of the return strand 7 and, together with the slide construction 20, is displaced by actuation of the adjusting device 30.

On the feed strand 6 is found a loading ramp 70, so that, when the whole of the transport conveyor advances, any debris lying on the base can be slid onto the transport plates 5 in the feed strand 6.

INDUSTRIAL APPLICABILITY

According to the present disclosure, the chain wheel may be fastened to a slide construction, which may be movable relative to the machine frame by means of an adjusting device, which may have a guide base. The guide base may be preferably displaceably guided in a recess in a base of the machine frame, and which may have guide elements, which latter may preferably comprise guide grooves fastened to a front region of the guide base and cooperate with guide rails fixedly fastened to the base of the machine frame. The slide construction may be locked in different displacement settings by means of a fixing device that may be fitted in the front region. The chain wheel may be preferably disposed on the slide construction in a middle portion between a stop for the adjusting device and the front region of the guide base.

The slide construction which may be used in the disclosed reversing station may make it possible, during continuous operation of the apron conveyor, to relieve the load on the adjusting device, in that the chain tension which may be set by means of the adjusting device by a relative movement between the machine frame, and the slide construction can be locked via the fixing device. The fixing device may be disposed in the front region of the slide construction, and thus outside that region in which the conveyor chain with the connected transport plates may circulate, so that the fitting or detachment of the fixing device can be undertaken by the maintenance staff, before or after the actuation of the adjusting device, without having to undertake any assembly or disassembly works in the region of circulation of the conveyor chain.

For ease of assembly, it may be particularly advantageous if the guide elements and the guide rails may be provided with rows of holes, into which locking bolts can be removably inserted as a fixing device. In order to be able to use the fixing device to lock almost any chosen adjustment of the chain tension of the conveyor chain despite relatively short rows of holes, the holes in the rows of holes in the guide elements and the holes in the row of holes in the guide rails may have different spacings, wherein the different spacings may be designed, in particular, to realize a vernier graduation. Depending on the state of displacement between the machine frame and the guide rails fixedly attached there, and depending on the slide construction together with the guide elements moved jointly with the slide construction, for the operating staff there may be generally only one mutually aligned pair of holes in the row of holes in the guide elements, and in the row of holes in the guide rails, into which the corresponding locking bolts can be inserted, whilst the other holes of the respective rows of holes may not be in mutual alignment and consequently may allow no locking.

The adjusting device can comprise, in particular, a hydraulic cylinder, which is connected or connectable at one end in a cylinder end stop connected to the base of the machine frame and at the other end to the stop on the slide device. For the fitting of the hydraulic cylinder, it may be, in particular, advantageous if the ends of the hydraulic cylinder may be provided with differently shaped stop lugs, and at least one of the stops on the machine frame or on the slide construction may be provided with a lug receiving fixture shaped in congruence with one of the stop lugs. Such an embodiment may ensure that the hydraulic cylinder can respectively be mounted only in the correct installation position, since incorrect assembly may be prevented by the necessary insertion of one of the stop lugs into the congruently shaped lug receiving fixture.

Between the machine frame and the slide construction can be arranged a path measuring device for registering the relative displacement between the machine frame and the slide construction, which path measuring device can preferably have a reed rod arranged parallel to the hydraulic cylinder.

In the particularly preferred embodiment, the slide construction may be provided with a bridge plate, which may be arranged parallel to and at a distance from the guide base, wherein the chain wheel, together with its mounting arrangement, can be or is disposed between the bridge plate and the guide base. The bridge plate and the base plate may preferably respectively have a window, in which a housing portion of a housing of the mounting arrangement of the chain wheel respectively may engage. Via the windows, an anti-twist protection for the housing of the mounting arrangement can at the same time be realized and, as a result of the bilateral support of the housing against the bridge plate and the guide base, the relatively high forces which may be generated with a tensioned conveyor chain can also be reliably transmitted into the slide construction and, via the slide construction, then into the fixing device.

In order to improve the entry of the chain and of the transport plates, the slide construction can be provided with chain deflectors, which protrude laterally over transverse sides of the slide construction. In all embodiments, the chain wheel may protrude at least partially over transverse sides of the slide construction in order that teeth on the chain wheel can cooperate with individual chain links of the conveyor chain. Furthermore, it may be advantageous if a preferably curved baffle plate may be fastened to the slide construction, which baffle plate may be moved jointly with the slide construction and may close the entry-side track of the conveyor chain in the return strand of the apron conveyor in the direction of the rear side of the machine frame.

The recess in the base of the machine frame can be closed with a sub-base, which may be partially provided with passages for residues of the material to be conveyed, should appropriate material penetrate into the region of the guide for the slide construction in the base of the machine frame.

For the use of the reversing station in an apron conveyor as described in DE 20 2012 100 777, it may be, in particular, advantageous if to both transverse sides of the slide construction there may be configured a plate track for the transport plates jointly movable with the conveyor chain, wherein the plate track may be closed both in the entry region of the chain wheel, hence in the return strand of the apron conveyor, and in the receiving space for the adjusting device and the guide elements, with cover plates against ingress of falling material. The feed strand of the plate belt, which may be located in the running direction of the conveyor chain between the chain wheel in the reversing station and the chain wheel in the drive station, may be upwardly open to allow mined material to be discharged or loaded onto the transport plates. For use in mining and/or in the mining of ore in shortwall or longwall working, the machine frame can be provided with track guides for a mining machine movable along the apron conveyor.

For the person skilled in the art, numerous modifications which should fall within the scope of the attached claims emerge from the preceding description. The positive guidance of the slide construction in the front region and also in the rear region could also be realized differently without departing from the scope of the attached claims.

Although the preferred embodiments of this invention have been described herein, improvements and modifications may be incorporated without departing from the scope of the following claims.

The invention claimed is:
1. A reversing station of an apron conveyor for mined or extracted ground material, comprising:
a machine frame including a base having a recess;
a slide construction being movable relative to the machine frame by means of an adjusting device and having a guide base displaceably guided in the recess;
a chain wheel fastened to the slide construction;
guide elements fastened to a front region of the guide base of the slide construction and cooperating with guide rails fixedly fastened to the base of the machine frame; and
a fixing device mountable to a front region of the slide construction, the slide construction being lockable in different displacement positions by means of the fixing device,
wherein the chain wheel is disposed on the slide construction in a middle portion between a stop for the adjusting device and the front region of the guide base of the slide construction,
wherein the guide elements and the guide rails are provided with rows of holes into which locking pins can be removably inserted as a fixing device,
wherein the holes in the row of holes in the guide elements and the holes in the row of holes in the guide rails have different spacings, the different spacings being designed for a vernier graduation, and
wherein a path measuring device is disposed between the machine frame and the slide construction for registering the relative displacement, path measuring device including a reed rod arranged parallel to the hydraulic cylinder.

2. The reversing station according to claim 1, wherein the adjusting device comprises a hydraulic cylinder being connected or connectable at one end on a cylinder end stop connected to the base of the machine frame and at the other end to the stop on the slide construction.

3. The reversing station according to claim 1, wherein the ends of the hydraulic cylinder are provided with differently shaped stop lugs, at least one of the stops on the machine frame or on the slide construction being provided with a lug receiving fixture shaped in congruence with one of the stop lugs.

4. The reversing station according to claim 1, wherein the slide construction is provided with chain deflectors laterally protruding over transverse sides of the slide construction.

5. The reversing station according to claim 1, wherein the chain wheel protrudes partially over transverse sides of the slide construction.

6. The reversing station according to claim 1, wherein a curved baffle plate is fastened to the slide construction, the baffle plate closing the entry-side track of the conveyor chain in the direction of the rear side of the machine frame.

7. The reversing station according to claim 1, wherein the recess in the base of the machine frame is closed with a sub-base, which is partially provided with passages for residues of the material to be conveyed.

8. The reversing station according to claim 1, wherein to both transverse sides of the slide construction, in the feed strand and in the return strand, there is configured a plate track for the transport plates jointly movable with the conveyor chain, wherein the plate track of the return strand in the entry region of the chain wheel and the receiving space for the adjusting device and the guide elements are closed with cover plates against ingress of falling material.

9. The reversing station according to claim 1, wherein the slide construction is provided with a bridge plate arranged in parallel to and at a distance from the guide base, the chain wheel, together with its mounting arrangement, can be or is disposed between the bridge plate and the guide base.

10. The reversing station according to claim 9, wherein the bridge plate and the base plate are respectively provided with a window, in which a housing portion of a housing of the mounting arrangement respectively engages.

11. The reversing station according to claim 1, wherein the machine frame is provided with track guides for a mining machine movable along the apron conveyor.

12. The reversing station according to claim 2, wherein a path measuring device is disposed between the machine frame and the slide construction for registering the relative displacement, path measuring device having a reed rod arranged parallel to the hydraulic cylinder.

13. An apron conveyor, comprising:
a conveyor chain, including:
a plurality of chain links; and
a plurality of transport plates connected to the chain links;
a machine frame including a base having a recess;
a slide construction being movable relative to the machine frame by means of an adjusting device and having a guide base displaceably guided in the recess;
a chain wheel fastened to the slide construction;
guide elements fastened to a front region of the guide base of the slide construction and cooperating with guide rails fixedly fastened to the base of the machine frame; and
a fixing device mountable to a front region of the slide construction, the slide construction being lockable in different displacement positions by means of the fixing device,
wherein the chain wheel is disposed on the slide construction in a middle portion between a stop for the adjusting device and the front region of the guide base of the slide construction and configured to drive the conveyor chain,
wherein the adjusting device comprises a hydraulic cylinder being connected or connectable at one end on a cylinder end stop connected to the base of the machine frame and at the other end to the stop on the slide construction, and
wherein a path measuring device is disposed between the machine frame and the slide construction for registering the relative displacement, path measuring device including a reed rod arranged parallel to the hydraulic cylinder.

14. The apron conveyor according to claim 13, wherein the guide elements and the guide rails are provided with rows of holes into which locking pins can be removably inserted as a fixing device.

15. The apron conveyor according to claim 14, wherein the holes in the row of holes in the guide elements and the holes in the row of holes in the guide rails have different spacings, the different spacings being designed for a vernier graduation.

* * * * *